L. WALTERS.
COTTON STALK PULLER AND CUTTER.
APPLICATION FILED MAR. 10, 1914.
1,148,878.
Patented Aug. 3, 1915.
4 SHEETS—SHEET 1.
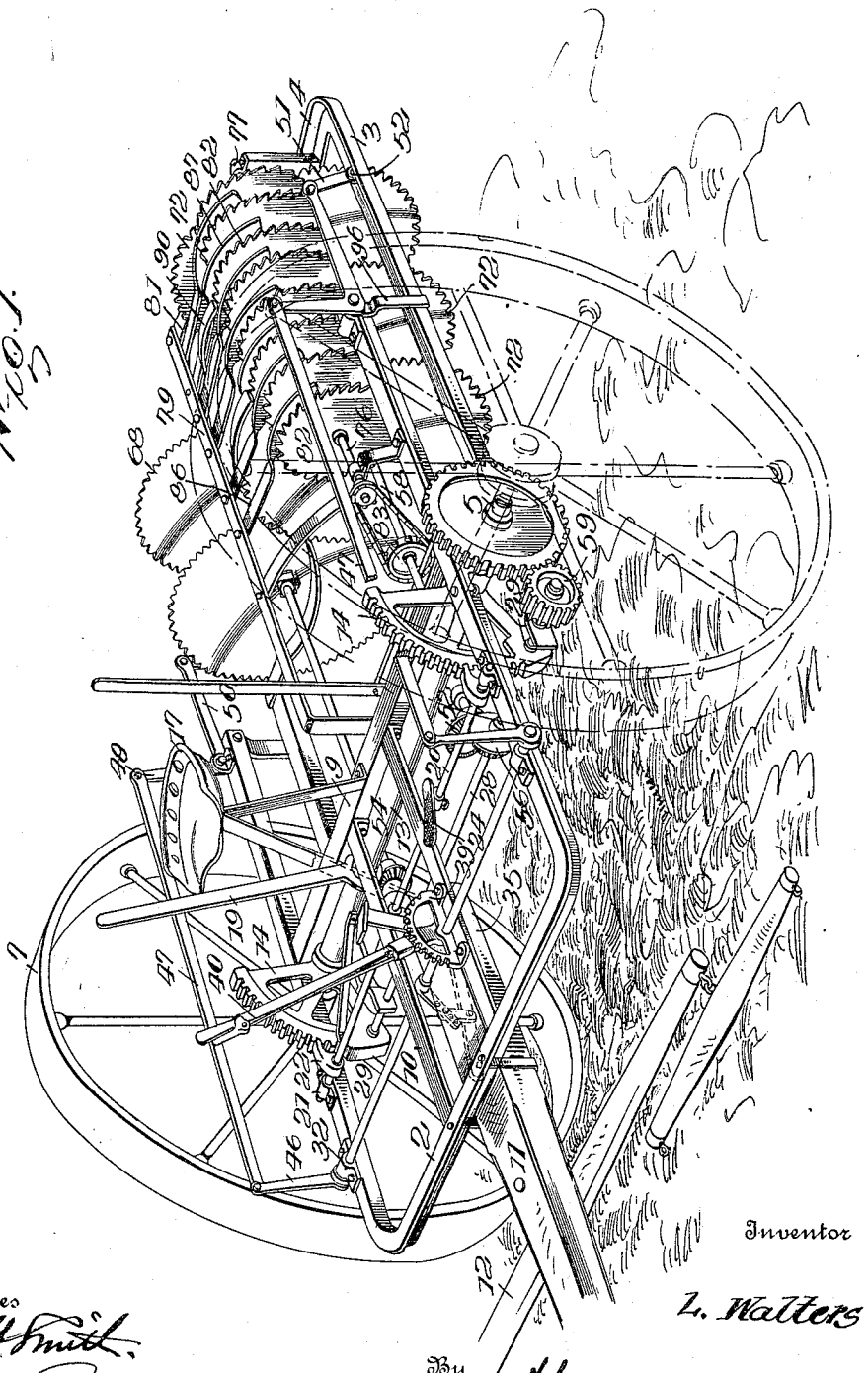

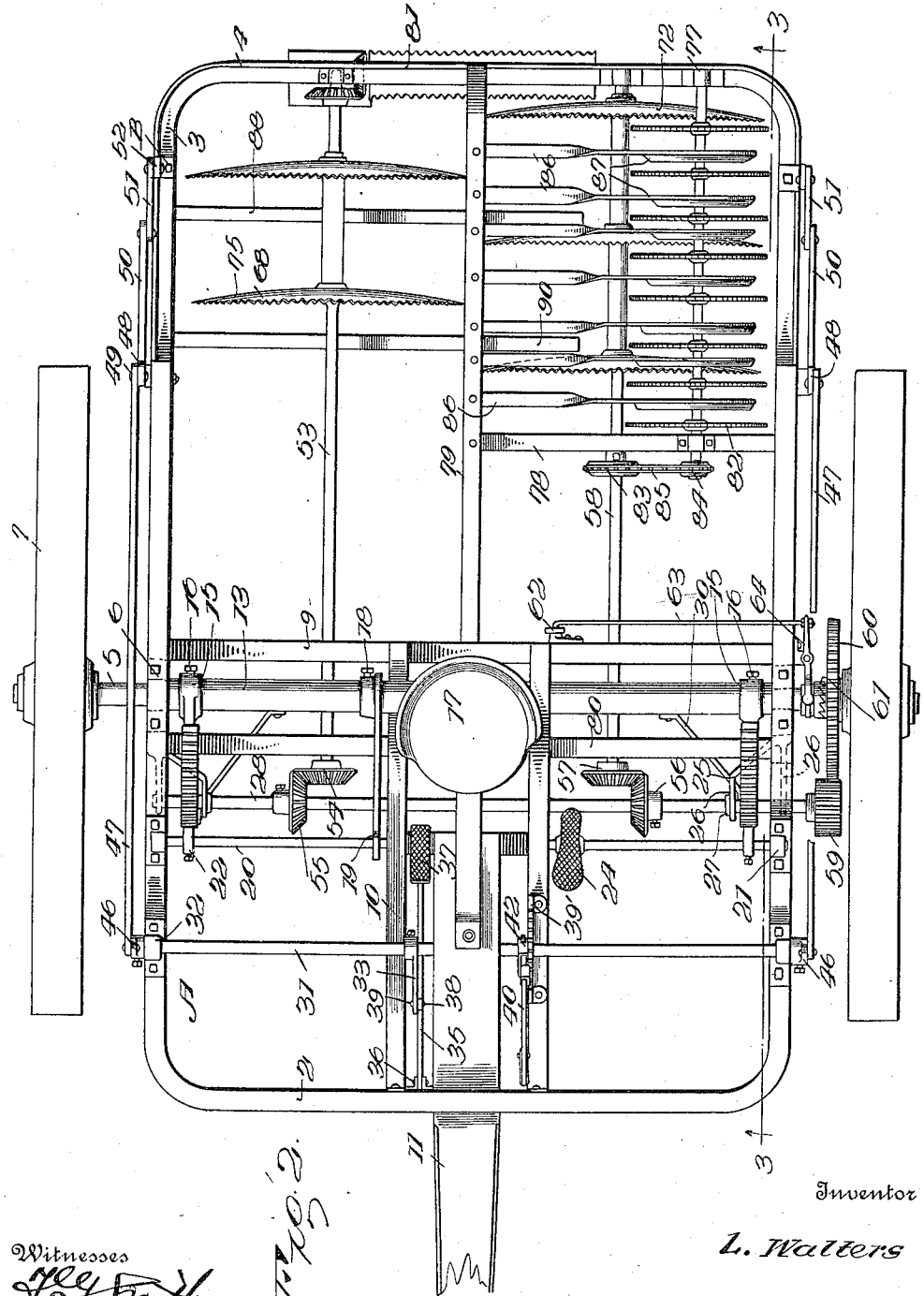

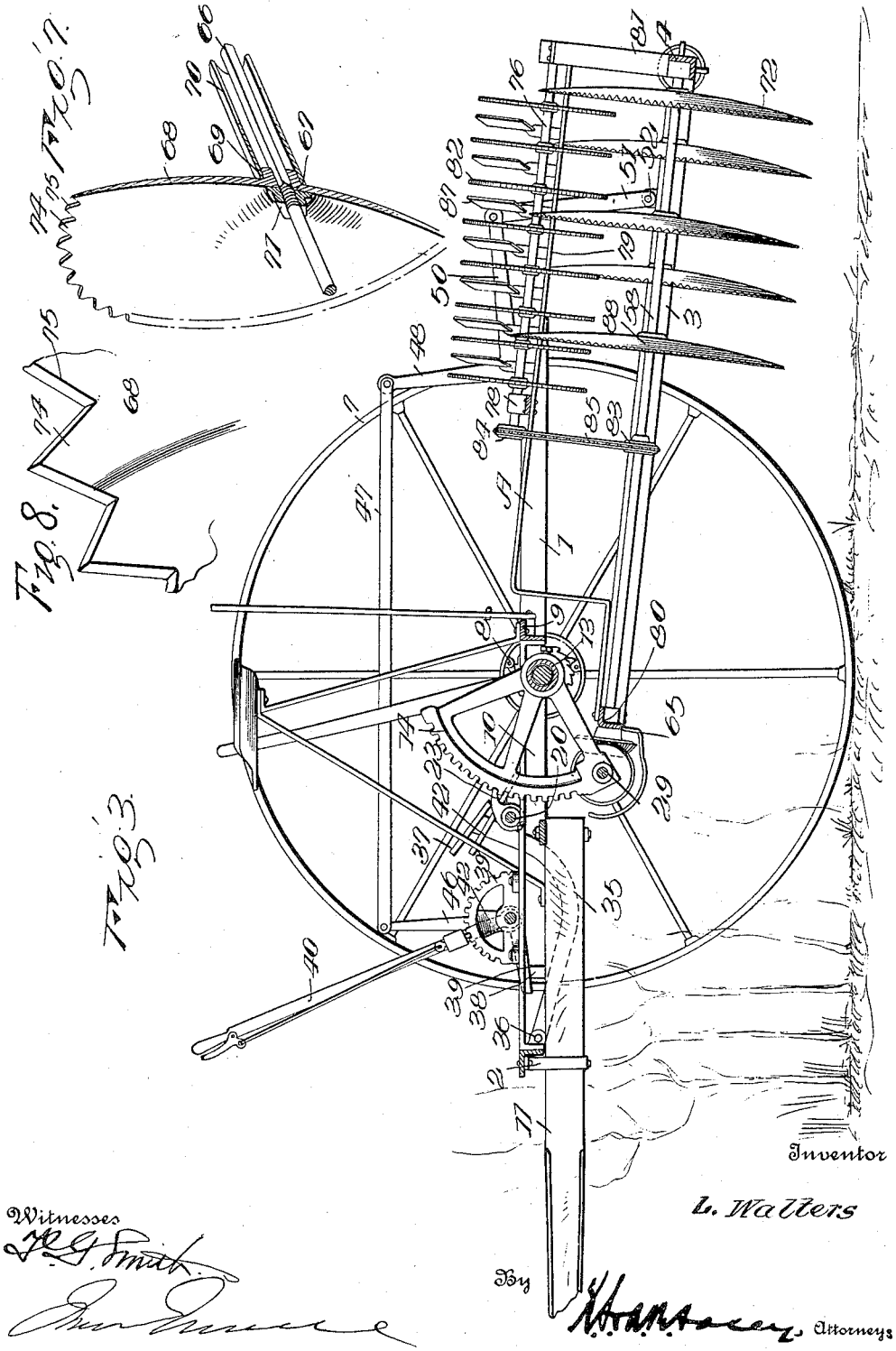

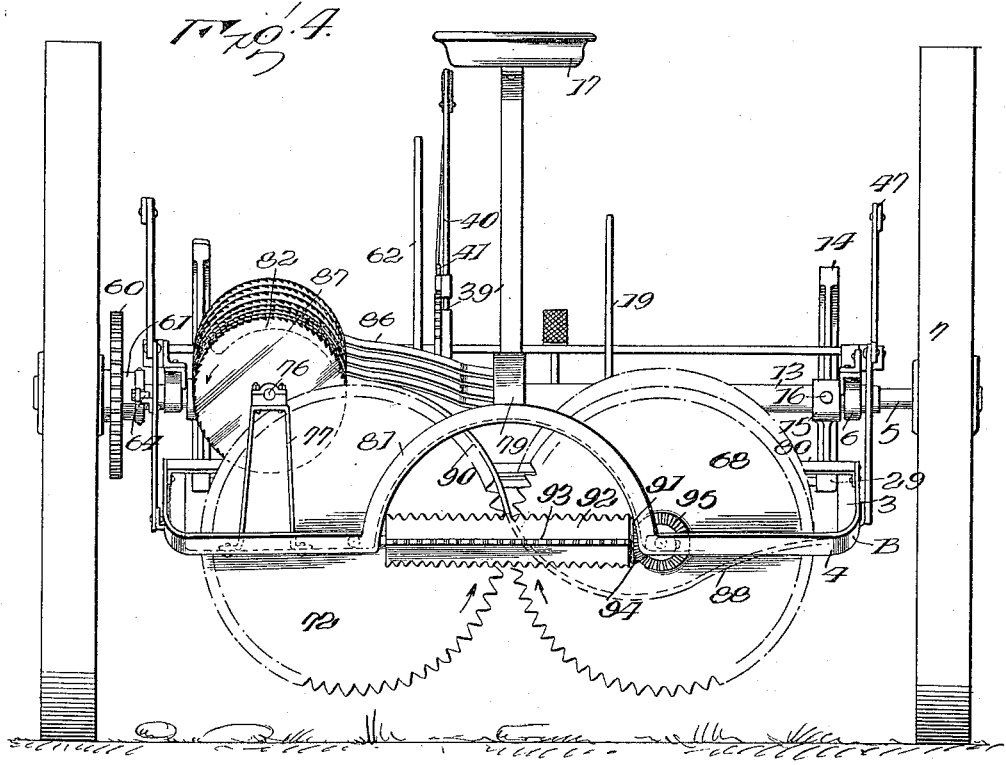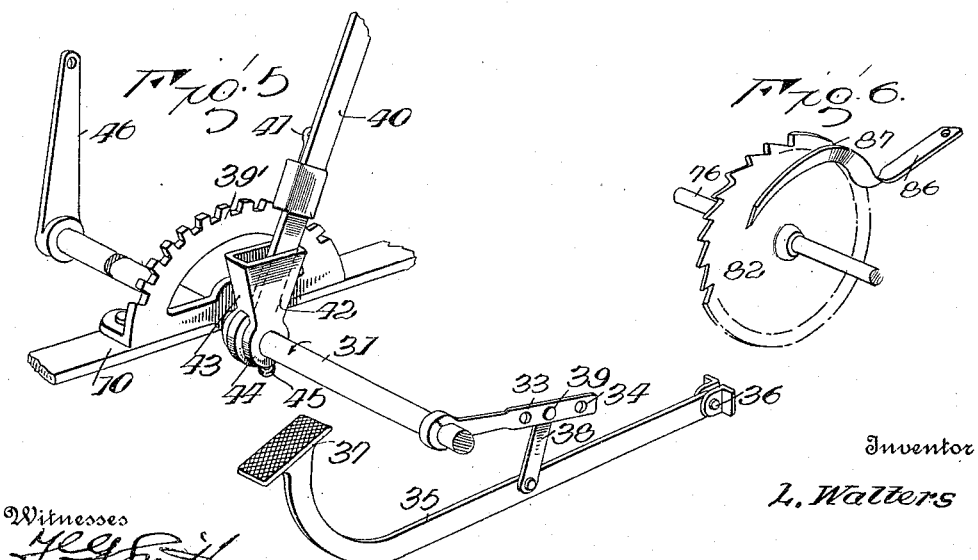

UNITED STATES PATENT OFFICE.

LONNIE WALTERS, OF LAVONIA, GEORGIA.

COTTON-STALK PULLER AND CUTTER.

1,148,878. Specification of Letters Patent. Patented Aug. 3, 1915.

Application filed March 10, 1914. Serial No. 823,723.

*To all whom it may concern:*

Be it known that I, LONNIE WALTERS, citizen of the United States, residing at Lavonia, in the county of Franklin and State of Georgia, have invented certain new and useful Improvements in Cotton-Stalk Pullers and Cutters, of which the following is a specification.

This invention relates to cotton stalk pullers and cutters, and has as its object to provide a machine which will, as it is drawn along rows of stalks, pull the stalks by the roots and cut the same into relatively short lengths.

The machine embodying the present invention presents an advantage over the ordinary cotton chopper in that the stalks are pulled by the roots, as distinguished from being chopped off close to the ground leaving a stubble and in that the stalks are cut in short lengths, which are deposited upon the ground to supply humus.

Briefly stated, the machine embodying the present invention comprises a main and an auxiliary frame, upon which latter are mounted the stalk pulling and stalk cutting mechanisms, and it is one aim of the invention to provide means for bodily raising and lowering the said auxiliary frame and for raising and lowering either end thereof, so that the said mechanisms may be adjusted to the most advantageous position for operating upon the stalks depending upon the prevalent conditions.

Another aim of the invention is to provide means for positively directing the pulled stalks toward the cutting mechanism and presenting the stalks in proper position to be acted upon thereby.

The invention further aims to so construct the cutting mechanism that the stalks will be cut with a shear cut and will not be likely to be merely bent or broken.

The invention also contemplates the provision of means for preventing the stalks slipping from the stalk pulling disks after they have been pulled and before they are presented to the cutting mechanism.

In the accompanying drawings: Figure 1 is a perspective view of the machine embodying the present invention. Fig. 2 is a top plan view thereof. Fig. 3 is a vertical longitudinal sectional view on the line 3—3 of Fig. 2. Fig. 4 is a rear elevation of the machine. Fig. 5 is a perspective view illustrating means for raising and lowering the rear end of the auxiliary frame. Fig. 6 is a perspective view illustrating a portion of the cutting mechanism. Fig. 7 is a sectional perspective view, illustrating the manner of mounting the stalk pulling disks. Fig. 8 is a similar view illustrating a portion of the edge of one of the disks.

Corresponding and like parts are referred to in the following description and indicated in all the views of the accompanying drawings by the same reference characters.

The machine embodying the present invention includes a main frame, indicated in general by the reference character A and an auxiliary frame, indicated by the reference character B. Both of these frames are preferably formed from L-angle iron, and the main frame includes side members 1 and a front connecting member 2, the frame being open at its rear end. The auxiliary frame includes side members 3 and a rear connecting member 4. An axle 5 is mounted in bearings 6 upon the under side of the main frame, and this axle serves to support the main frame, which latter in turn supports the auxiliary frame in a manner which will presently be described. Wheels 7 are mounted at the ends of the axle 5 and are connected for forward rotation with the axle by means of a ratchet mechanism 8, the said ratchet mechanism providing for ready turning movement of the machine. A cross-piece 9 extends transversely between the side members 1 of the main frame and spaced bars 10 extend rearwardly from the connecting member 2 of the said main frame and are secured at their rear ends to the said cross-piece 9. A tongue 11 is mounted beneath the forward portion of the main frame and carries the usual double-tree 12. The auxiliary frame is supported at both its forward and rear ends, and, as before stated, means is provided for raising and lowering each of its said ends. The means for supporting the forward end of the auxiliary frame will now be described. A sleeve shaft 13 is mounted for oscillatory movement upon the axle 5 and extends between the side members 1 of the main frame.

The numeral 14 indicates segmental racks, each of which is provided with a collar 15 secured upon the sleeve shaft 13 by means of a set bolt 16. Two of these racks are employed and they are arranged at the ends of the said sleeve shaft, as will be apparent by reference to Fig. 2 of the drawings.

The operator's seat is indicated by the numeral 17 and is preferably supported upon the rear end of the tongue 11 and fixed upon the sleeve shaft 13 at one side of the said seat 17, as indicated by the numeral 18, is a hand lever 19 which may be grasped for the purpose of rocking the said sleeve shaft upon the axle 5, it being understood that upon such movement of the sleeve shaft, the segmental racks 14 will be correspondingly moved. In order that the sleeve shaft 13 may be held at various positions of angular adjustment, a pawl mechanism is provided for coöperation with the said segmental racks. This mechanism includes a shaft 20 which is mounted for rocking movement at its ends in bearings 21 upon the side members 1 of the main frame. Fixed upon the said shaft 20 in advance of each of the segmental racks is a pawl 22 having a squared end 23 designed to snugly engage between adjacent teeth of the respective segmental rack. In order that the shaft 20 may be rocked so as to move the pawls 22 into and out of engagement with the segmental racks, a foot lever 24 is secured to the said shaft 20 approximately in front of the operator's seat 17. It will now be apparent that when it is desired to rock or angularly adjust the sleeve shaft 13 the foot lever 24 is pressed forwardly to disengage the pawls from the segmental racks, whereupon the lever 19 may be rocked to secure the desired adjustment. After such adjustment has been secured, the foot lever is returned to normal position so as to bring the pawls into coöperative engagement with the racks, whereupon the shaft will be held at adjustment.

A bearing member 25 is secured to the forward end of each of the side members 3 of the auxiliary frame and includes spaced forwardly extending arms 26 having bearings 27 at their ends, in which bearings is rotatably mounted a shaft 28. The arms 26 straddle the lower corners of the segmental racks 14 as clearly shown in Fig. 2 of the drawings, and the shaft 28 extends at its ends through bearings 29 at the said corners of the racks. The purpose of the shaft 28 will be presently explained, but at this point it is to be observed that due to the fact that the shaft 28 is journaled in and supported by the segmental racks 14, these racks serve to support the forward end of the auxiliary frame. As a consequence, when the racks are swung downwardly, the said forward end of the auxiliary frame will be lowered, and when the racks are swung upwardly, the said end of the frame will be raised. Therefore, by adjusting the sleeve shaft 13 through manipulation of the hand lever 19, the forward end of the auxiliary frame may be raised or lowered as desired by the operator of the machine and may be held at the desired adjustment. Braces 30 are preferably secured to the sleeve shaft 13 and to the segmental racks 14 so as to brace the racks against any tendency toward lateral displacement. The means provided for raising and lowering the rear end of the auxiliary frame includes a shaft 31 which is mounted in bearings 32 upon the side members 1 of the main frame, and this shaft has secured to it, preferably at a point substantially in front of the operator's seat 17 an arm 33 provided with a series of openings 34. A foot lever 35 is pivotally mounted at its forward end in a bearing 36 upon the connecting side member 2 of the main frame and extends rearwardly beneath the shaft 31 and thence upwardly in the rear of the said shaft and is provided at its upper end with a foot piece 37. A link 38 is pivoted to the lever 35 and is pivotally connected by means of a bolt 39 with a crank arm, the bolt 39 being engageable interchangeably in the bearings 34, whereby the throw of the arm, upon movement the lever 35 may be regulated. As will be presently explained, the foot lever is designed to be swung downwardly by foot power to raise the rear end of the auxiliary frame, and the means which is provided for holding the shaft 31 at adjustment will now be described. A segmental rack 39' is secured upon one of the bars 10 and loosely mounted upon the shaft 31 is a hand lever 40 having the usual pawl device 41 for coöperation with the rack whereby to hold the lever at adjustment. This lever may be employed simultaneously with the foot lever 35 for rotating the shaft 31, but its primary function is to serve as a stop for coöperation with an abutment device which is arranged upon the shaft 31 and serves to hold the shaft against rotation in one direction while permitting of its being rocked in the opposite direction through the depression of the foot lever 37 and without interfering with the lever 40.

The abutment device above mentioned is preferably, although not necessarily, in the form of a hollow box 42 having its forward and rear walls inclined downwardly toward each other, as at 43. The box is provided at its forward end with spaced collars 44 which are secured upon the shaft 41 by means of set bolts 45. The box is open at its lower end between the collars 44 to receive the loosely mounted lower end of the shaft 40. By reference to Figs. 2, 3 and 5 of the drawings it will be understood that rotation of the shaft 31 in the direction indicated by the arrow, is prevented by reason of the engagement of the forward side or wall of the box 42 against the lever 40. It will be apparent furthermore that upon depression of the foot lever 35 the arm 33 will be swung downwardly after rotating the shaft 31 in a direction opposite to that indicated by the arrow, such movement being limited only by the engagement of the rear side or wall of the box 42 against the lever.

The purpose of this structure will now be explained. The ends of the shaft 31 project beyond the bearings 32 in which the shaft is journaled, and fixed upon each projecting end of the said shaft is an upstanding arm 46 to the upper end of which is pivotally connected the forward end of a rod 47. The rear end of each of the rods 47 is pivoted to one arm 48 of an angle lever mounted for rocking movement as at 49 upon the corresponding side member 1 of the main frame. The other arm of each of the said levers, indicated by the numeral 50, has pivoted to it the upper end of a link 51, the lower end of which is pivotally connected as at 52 to the corresponding side member 3 of the auxiliary frame. It will now be apparent that when the shaft 31 is rocked in one direction or the other, the rear end of the auxiliary frame will be raised or lowered as the case may be. It will furthermore be apparent that after the rear end of the auxiliary frame has been adjusted to the desired height, the frame will be supported in this meshes with a beveled gear 57 upon the forward edge of the box 42 against the lever 40. However, should it become necessary to drive the machine over a stump or other similar obstruction, the foot lever 35 may be swung downwardly until the rear side of the box 42 engages with the lever 40. This movement of the foot lever 35 will result in the rear end of the auxiliary frame being further elevated so as to clear the obstruction.

A shaft 53 is mounted for rotation within the auxiliary frame at one side of the middle thereof and has fixed upon it at its for means of a pinion 59 which meshes with a similar gear 55 upon the shaft 28. A beveled gear 56 also fixed upon the shaft 28, meshes with a beveled bear 57 upon the forward end of a shaft 58 which is mounted parallel to the shaft 53 and at the opposite side of the middle of the said auxiliary frame. In the forward movement of the machine rotary motion is imparted to the shafts 53 and 58 in opposite directions by means of a pinion 59 which meshes with a gear 60 loosely mounted upon the axle 5 and adapted to be connected for rotation therewith by means of a clutch 61 which is splined upon the axle and may be shifted into and out of engagement with the clutch portion of the gear 60 through the medium of a hand lever 62 mounted upon the cross bar 9 at one side of the seat 17, the said lever being connected by a rod 63 with a rock arm 64 mounted upon that side member of the main frame which is located adjacent to the said clutch, the rock arm being, of course, operatively connected with the clutch 61.

It is preferable that shields 65 be mounted upon the forward end of the auxiliary frame, as shown in Fig. 3 of the drawings, to prevent the gears 54, 55, 56 and 57 becoming fouled with the standing stalks. At this point it is to be observed that the shaft 28 is located concentrically with respect to the axle 5 and, consequently, the pinion 59 will mesh with the gear 60 at all points in the adjustment of the segmental racks 14. The shaft 53 is provided adjacent its rear end with a squared portion 66 and at each end of its squared portion is threaded as at 67. Stalk pulling disks 68 are fitted upon each end of the squared portion 66 of the said shaft and each disk has a hub portion 69, the said hub portions of the two disks projecting toward each other and fitting into the ends of a spacing sleeve 70 which serves to properly space the disks. Nuts 71 are threaded on to the threaded portions 57 of the shaft 53 and may be tightened for the purpose of binding the hub portions of the disks against the ends of the spacing sleeves. In a like manner stalk pulling disks 72 are mounted upon the shaft 58 and are spaced by spacing sleeves 73, the said disks 72 being mounted in precisely the same manner as the disks 68. By reference to Fig. 2 of the drawings, it will be observed that in the embodiment of the invention therein illustrated, there are three of the disks 72 and only two of the disks 68, the two sets of disks being arranged in staggered relation and with the peripheries of the disks of the two sets practically touching the longitudinal median line of the machine. For a purpose to be presently explained, the stalk pulling disks 68 and 72 are concavo-convex and are provided at their peripheries with teeth 74 which, at the convex sides of the disks, are beveled as indicated at 75, so that the edges of the teeth will be relatively sharp.

The shaft 76 is mounted in bearings 77 located one upon the rear cross member 4 of the auxiliary frame and the other upon a cross bar 78 which is secured at one end to one of the side members of the said auxiliary frame and at its other end to an arched bracket bar 79 which is secured to a cross-piece 80 at the forward end of the auxiliary frame, and to an intermediate arched portion 81 formed in the rear cross member of the said frame, the bracket bar extending longitudinally medially of the frame as clearly shown in Fig. 2 of the drawings. Fixed upon the shaft 76 are a number of peripherally toothed drag disks 82, these disks being preferably equidistantly spaced and at intervals in the series alternating with the stalk pulling disks 72. A sprocket gear 83 is fixed upon the shaft 58 and a similar gear 84 is fixed upon the forward end of the shaft 76, a sprocket chain 85 being trained over these gears, whereby to transmit rotary motion to the shaft 76 as the shaft 58 is rotated. The drag disks are designed for the purpose of dragging or carrying the pulled stalks beneath the knives which cut the stalks. A series of the knives is provided and each includes a shank portion 86 secured upon the bracket bar 79 and extending from the said bar in the direction of the drag disks 82. The knife blades are indicated by the numeral 87 and are relatively long and arcuate, their concave or cutting edges being presented downwardly. By reference to Fig. 4 of the drawings, it will be observed that each of the blades 87 is located between two of the drag disks 82 and that the backs of the blades are substantially coincident with the upper edges of the said drag disks, the cutting edges of the blades being located concentrically to the said edges of the disks. In order that the pulled stalks may be directed to the cutting mechanism, they are provided with two or more yieldable deflectors 88, each comprising a suitable length of bar metal secured at one end to the under side of that side member 3 of the auxiliary frame other than the side member adjacent which the cutting mechanism is located. The deflectors are extended laterally in the direction of the last-mentioned side of the frame and are curved downwardly beneath the shaft 53 as indicated at 89 in Fig. 4 of the drawings and are thence curved to extend upwardly and substantially coincident with the peripheries of the disks 72 as indicated at 90. The deflectors have their portions 90 extending between the disks 72 as shown in Fig. 2 of the drawings, and it will be observed that the lower end of the portion 90 of each of the deflectors is located substantially at the points of contact of the circles described by the peripheries of the disks 68 and 72.

Assuming now that the auxiliary frame has been properly adjusted, the machine is driven along the row of stalks to be cut and as the pulling disks 68 and 72 encounter the branches of the stalks, the stalks are pulled up by the roots. As the stalks meet the portions 90 of the deflectors 88 they are turned so as to lie lengthwise against the edges of the disks 72 and are furthermore securely held in this position by the said portions of the deflectors and are therefore prevented from being carried upwardly and over by the toothed edges of the disks 68. Furthermore, it will be apparent that the flattened shanks 86 of the cutting knives assist the deflectors in holding the stalks across the peripheries of the disks 72 in position to be presented to the drag disks 82, which disks, when they engage the stalks, carry the stalks beneath the cutting edges of the knives 87 whereupon the stalks are cut into relatively short lengths. By reference to Fig. 2, it will be observed that the blades 87 are each disposed at an angle to the forward one of the two disks between which it extends, so that the stalks are cut with a shear cut as distinguished from a straight cut, which would very likely result in the stalks being merely bent or broken. It will be understood, of course, that the shanks 86 of the knives are resilient, so that the knives may yield in an upward direction as the stalks pass beneath them to a greater or less degree depending upon the bulk of the stalks. It will also be apparent at this point that by beveling the edges of the teeth at the convex side of the disks 68 and 72, the teeth are prevented from slipping out of engagement with the branches of the stalks as the disks are rotated. Furthermore, due to the fact that the concaved sides of the stalk pulling disks are presented forwardly, the proper engagement of the toothed peripheries of the disks with the branches of the stalks is insured, as the said peripheries of the disks will engage with the stalks or their branches, before the latter engage with the forward edges of the disks which would not be the case if the disks were plane.

In order to positively insure against retrograde movement of the stalks as they are pulled upwardly by the disks 68 and 72 a shaft 91 is mounted in bearings at opposite ends of the arched portion 81 of the rear side of the auxiliary frame, the shaft spanning the said arched portion and being provided with a number of radially disposed blades 92 having toothed edges 93. A beveled gear 94 is mounted at one end of the shaft 91 and meshes with a similar gear 95 at the rear end of the shaft 53. It will be apparent that as the shaft 53 is rotated rotary movement in a forward direction will be imparted to the shaft 91 so that any stalks which may slip rearwardly will be engaged by the toothed edges of the blades 92 and thrown forwardly. It will also be apparent that any stalks which might be left standing after the pulling disks have passed will be likely to be pulled and thrown forwardly by the blades 92.

In order to restrain the supplemental frame against lateral displacement with respect to the fixed frame, bracket arms 96 are secured to the side bars of the main frame at or adjacent their rear ends and project downwardly beside the side bars of the supplemental frame, these arms being of a length sufficient to engage with the side bars of the supplemental frame at all positions of adjustment of the said frame.

Having thus described the invention what is claimed as new is:

1. In a machine of the class described, a frame, stalk pulling mechanism mounted in the frame, drag disks rotatably mounted in the frame, in juxta-position to the stalk pulling mechanism, and yieldable knives arranged in position to sever the stalks acted upon by said drag disks.

2. In a machine of the class described, a frame, stalk pulling mechanism mounted in the frame, spaced drag disks rotatably mounted in the frame, and a yieldably supported knife having its blade portion projecting between the said disks.

3. In a machine of the class described, a frame, shafts mounted for rotation in the frame, peripherally toothed stalk pulling disks mounted upon the shafts, spaced drag disks mounted for rotation in the frame in juxta-position to the first-mentioned disks, means for presenting the stalks pulled by the first mentioned disks to the drag disks, and a knife arranged in juxta-position to the said drag disks.

4. In stalk pulling mechanism, a support, stalk pulling disks mounted for rotation upon the support, the peripheries of the disks being toothed and the said disks having forwardly presented concave sides.

5. In a machine of the class described, a frame, stalk pulling disks mounted in the frame for rotation, a yieldable deflector extending beside the disks and arranged to guide the pulled stalks in the direction of one set of the disks and to hold the stalks in engagement with the peripheries thereof, and stalk cutting mechanism arranged in juxta-position to the said set of the disks.

6. Stalk cutting mechanism including spaced drag disks, and a knife having its blade portion extending between the disks and inclined with its cutting edge presented toward one of the disks.

7. In mechanism of the class described, a frame, stalk pulling mechanism mounted on the frame, and means arranged at the rear of the said mechanism for advancing the stalks having a retrograde movement, the said means including a rotary shaft, and blades projecting radially from the shaft.

8. In a machine of the class described, a frame, spaced shafts mounted in the frame for rotary movement, means for rotating the shafts, stalk pulling members fixed upon the shafts, the members upon the shafts being arranged relatively in staggered relation, a third shaft journaled in the frame, drag members mounted upon the last-mentioned shaft and positioned between the stalk pulling members upon the adjacent one of the first mentioned shafts, and a series of knives having resilient shanks fixedly mounted within the frame, the blades of the knives extending between adjacent ones of the drag members.

9. In a machine of the class described, a frame, shafts mounted for rotary movement in the frame, means for rotating the shafts, each of the shafts having a squared portion, sleeves extending between the disks upon the squared portions of the shafts, spacing sleeves extending between the disks upon each of the shafts, each shaft adjacent its squared portion being threaded, nuts engaged upon the threaded portions of the shafts and binding the pulling disks against the ends of their spacing sleeves, and a cutter mechanism arranged in operative relation to the said pulling disks.

10. In mechanism of the class described, a frame, stalk pulling mechanism mounted on the frame, and a rotary toothed member arranged at the rear of the said mechanism for advancing stalks having a retrograde movement.

In testimony whereof I affix my signature in presence of two witnesses.

LONNIE WALTERS. [L. s.]

Witnesses:
J. H. BURTON,
J. L. SANDERS.